(12) United States Patent
Lillienskjold

(10) Patent No.: US 9,347,600 B2
(45) Date of Patent: May 24, 2016

(54) MACHINE FOOT

(71) Applicant: NGI A/S, Nørresundby (DK)

(72) Inventor: Lars Von Lillienskjold, Nørresundby (DK)

(73) Assignee: NGI A/S, Norresundby (DK)

( * ) Notice: Subject to any disclaimer, the term of this patent is extended or adjusted under 35 U.S.C. 154(b) by 0 days.

(21) Appl. No.: 14/654,824

(22) PCT Filed: Jan. 15, 2014

(86) PCT No.: PCT/DK2014/000002
§ 371 (c)(1),
(2) Date: Jun. 22, 2015

(87) PCT Pub. No.: WO2011/124647
PCT Pub. Date: Aug. 21, 2014

(65) Prior Publication Data
US 2015/0338015 A1    Nov. 26, 2015

(30) Foreign Application Priority Data

Feb. 15, 2013  (DK) .................. 2013 00092
Apr. 8, 2013   (DK) .................. 2013 00204

(51) Int. Cl.
*F16M 11/20*   (2006.01)
*F16M 7/00*    (2006.01)
*F16B 11/00*   (2006.01)

(52) U.S. Cl.
CPC ............... *F16M 7/00* (2013.01); *F16B 11/006* (2013.01)

(58) Field of Classification Search
USPC .......................... 248/688, 615, 664, 673, 677
See application file for complete search history.

(56) References Cited

U.S. PATENT DOCUMENTS

| | | | | |
|---|---|---|---|---|
| 2,602,616 A | * | 7/1952 | Helmond | B41J 29/08 248/615 |
| 2,660,387 A | * | 11/1953 | Roy | F16F 1/3615 248/574 |
| 2,921,760 A | * | 1/1960 | Wheeler | F16F 1/3615 16/42 R |
| 3,007,660 A | * | 11/1961 | Rosan | F16F 3/02 248/565 |
| 3,601,345 A | * | 8/1971 | Johnson | F16F 1/371 248/188.9 |
| 3,730,463 A | * | 5/1973 | Richard | F16F 1/3732 248/580 |
| 3,815,852 A | * | 6/1974 | May | F16F 1/3615 248/569 |
| 3,831,774 A | * | 8/1974 | Moore | E02F 9/085 248/357 |

(Continued)

FOREIGN PATENT DOCUMENTS

| | | |
|---|---|---|
| DE | 20023343 | 11/2003 |
| DK | 176705 | 3/2009 |
| JP | 05288297 | 11/1993 |

*Primary Examiner* — Bradley Duckworth
(74) *Attorney, Agent, or Firm* — Ware, Fressola, Maguire & Barber LLP

(57) ABSTRACT

The invention relates to a machine foot (1*a*,1*b*), which comprises a top part (3*a*,3*b*) for attachment in a device such as a machine and a lower part (2) for contacting against a foundation, such as a floor, where the center axis of the top part (3*a*,3*b*) is movable a number of degrees (11) in relation to the center axis of the lower part (2), and where the lower part (2) comprises a housing (4), which preferably is made from a metal, and which at the bottom is provided with a polymeric material (5), where the polymeric material (5) is shaped as a ring that surrounds a plug (6), which is attached to the housing (4) by being glued to an annular contact surface (8) at the periphery of the plug (6).

12 Claims, 3 Drawing Sheets

(56) References Cited

U.S. PATENT DOCUMENTS

| | | | | |
|---|---|---|---|---|
| 4,061,298 A | * | 12/1977 | Kober | F16M 7/00 248/188.4 |
| 4,575,034 A | * | 3/1986 | Tobey | A47B 91/066 248/188.9 |
| 4,576,357 A | * | 3/1986 | Schrepfer | F16M 7/00 248/188.2 |
| 5,000,416 A | * | 3/1991 | Fantasia | B23Q 1/5462 248/182.1 |
| 5,842,678 A | | 12/1998 | Svejkovsky | |
| 6,742,750 B2 | * | 6/2004 | Burr | F16M 7/00 248/188.2 |
| 6,938,872 B2 | * | 9/2005 | Nygaard | F16M 7/00 248/188.8 |
| 7,287,732 B2 | * | 10/2007 | Balistreri | A47B 91/024 16/32 |
| 7,438,274 B2 | * | 10/2008 | Vermeulen | F16M 7/00 248/188.4 |
| 8,141,841 B2 | * | 3/2012 | von Lillienskjold | F16F 1/445 248/188.8 |
| 2001/0019096 A1 | * | 9/2001 | Andreoli | F16M 7/00 248/188.8 |
| 2002/0008187 A1 | | 1/2002 | Ganter | |
| 2014/0175256 A1 | * | 6/2014 | Sugita | F16F 15/08 248/615 |

* cited by examiner

MACHINE FOOT

CROSS-REFERENCE TO RELATED APPLICATIONS

This application is a U.S. national state of International Appl. No. PCT/DK2014/000002 filed 15 Jan. 2014, which claimed priority to Danish Appl. Nos. PA 2013 00092 filed 15 Feb. 2013 and PA 2013 00204 filed 8 Apr. 2013, which applications are incorporated herein by reference in their entireties.

TECHNICAL FIELD

The invention relates to a machine foot, which comprises a top part for attachment in a device such as a machine and a lower part for contacting against a foundation, such as a floor, where the center axis of the top part is movable a number of degrees in relation to the center axis of the lower part, and where the lower part comprises a housing, which preferably is made from a metal, and which at the bottom is provided with a polymeric material, and that the top part is attached to the housing of the lower part with a bolt.

The invention relates moreover to the use of the machine foot.

BACKGROUND

From DK176705 B1 is known a machine foot, which is well suited to be used in places with high hygiene standards.

The machine foot comprises a top part for attachment in a device such as a machine and a lower part for contacting against a foundation such as a floor, where the center axis of the top part is movable a number of degrees in relation to the center axis of the lower part, and where the lower part comprises a housing, which preferably is made from a metal, and which at the bottom is provided with a polymeric material.

The one from DK176705 B1 is characterized in that the lower part and the top part can be made and stocked as separate units that are not assembled until after a specific order, which is expedient as a finished and assembled machine foot physically is a relatively voluminous component, that requires space and thus is relatively costly to stock.

The top part and bottom part of the machine foot are assembled by inserting the top part into the bottom part.

It is however a disadvantage of the machine foot known from DK176705 B1 that the construction primarily can manage a large pressure, but cannot manage a corresponding high tension.

From US 2002/0008187 A1 (Ganter) 2002.01.24 is known a machine foot, which comprises a top part for attachment in a device such as a machine, and a lower part for contacting against a foundation such as a floor, where the center axis of the top part is movable a number of degrees in relation to the center axis of the lower part, and where the lower part comprises a housing, which is made from metal, and which at the bottom is provided with a polymeric material formed as a ring that surrounds a bolt, which is screwed into the top part from the bottom.

However there is some disadvantages of the machine foot described in US 2002/0008187 A1, among these that the bolt, which is screwed into the top part from the bottom and thus attaches the top part to the bottom part, is embedded in the polymeric material, which thus can be damaged in case a tension between the top part and the bottom part occurs. In case the polymeric material is damaged in this way the top part and lower part will afterwards not be assembled in a well-defined way, whereby cracks can arise between the parts, where impurities and bacteria can gather. The machine foot can therefore not be approved for use in applications that has particular demands to hygiene.

The embedding of the bolt in the polymeric material results as mentioned in the disadvantage that the machine foot is not able to resist a physical tension between top part and bottom part, which means that the machine foot is not usable in applications where there for example is risk of earthquakes. For the same reason the machine foot is not provided with means for attachment of the machine foot against the support.

Moreover, it is a disadvantage of the machine foot described in US 2002/0008187 A1 that there is an open gap between the bolt, which is screwed in the top part and the base from the bottom, whereby impurities and bacteria can gather in the open gap.

Furthermore, the machine foot mentioned in US 2002/0008187A1 does not encompass seals between top part and bottom part, and can therefore be contaminated by impurities and bacteria in this area.

There are thus substantial disadvantages of the machine foot known from US 2002/00081817 A1, as it cannot be approved for use at locations, where there is risk of earthquakes, which can cause huge tensions in machine feet that are attached to a foundation by means of fastening with bolts, just as the machine foot cannot be approved for use in applications, which has particular demands to hygiene.

SUMMARY OF THE INVENTION

It is thus an object of the invention to provide a machine foot without the above-mentioned disadvantages.

The object of the invention is realized by a machine foot comprising a top part configured for attachment in a device, and a lower part configured for contact against a foundation, wherein a center axis of the top part is movable a number of degrees in relation to a center axis of the lower part, wherein the lower part comprises a housing having a polymeric material shaped as a ring at the bottom thereof and surrounding a plug attached to the housing by being glued to an annual contact surface at the periphery of the plug, wherein the top part is attached to the housing of the lower part with a bolt having a head, wherein a ring is positioned between the head of the bolt and, wherein the ring is shaped as a hemisphere with a center of the hemisphere being the center of rotation for the movement of the top part in relation to the lower part, wherein the head of the bolt is covered by a cover plate abutting a recess in the housing, and wherein the plug has an upper surface abutting the cover plate.

In this way it thus becomes possible to manufacture top parts and lower parts as independent components, which likewise can be stocked as separate units, which are not assembled to a specific unit until after order, at the time the machine foot can be assembled by means of a bolt that is introduced from the lower part to the top part, whereby the machine foot can resist a high tension. After mounting of for example a bolt the plug can be mounted, whereby the machine foot is hermetically closed and thereby suitable for use in applications, which partly has high demands to hygiene and partly has demands to the ability of the machine foot to resist high tension forces.

Other appropriate embodiments for the machine foot are shown and described further below.

As mentioned the invention also relates to the use of above-mentioned machine foot to in locations with high demands to hygiene, such as locations for processing of foodstuffs or manufacturing of medicine.

Additional uses of the machine foot are mentioned further below.

BRIEF DESCRIPTION OF THE DRAWINGS

The invention will hereafter be explained in detail with reference to the drawings, wherein.

DETAILED DESCRIPTION OF THE INVENTION

Figure 1:
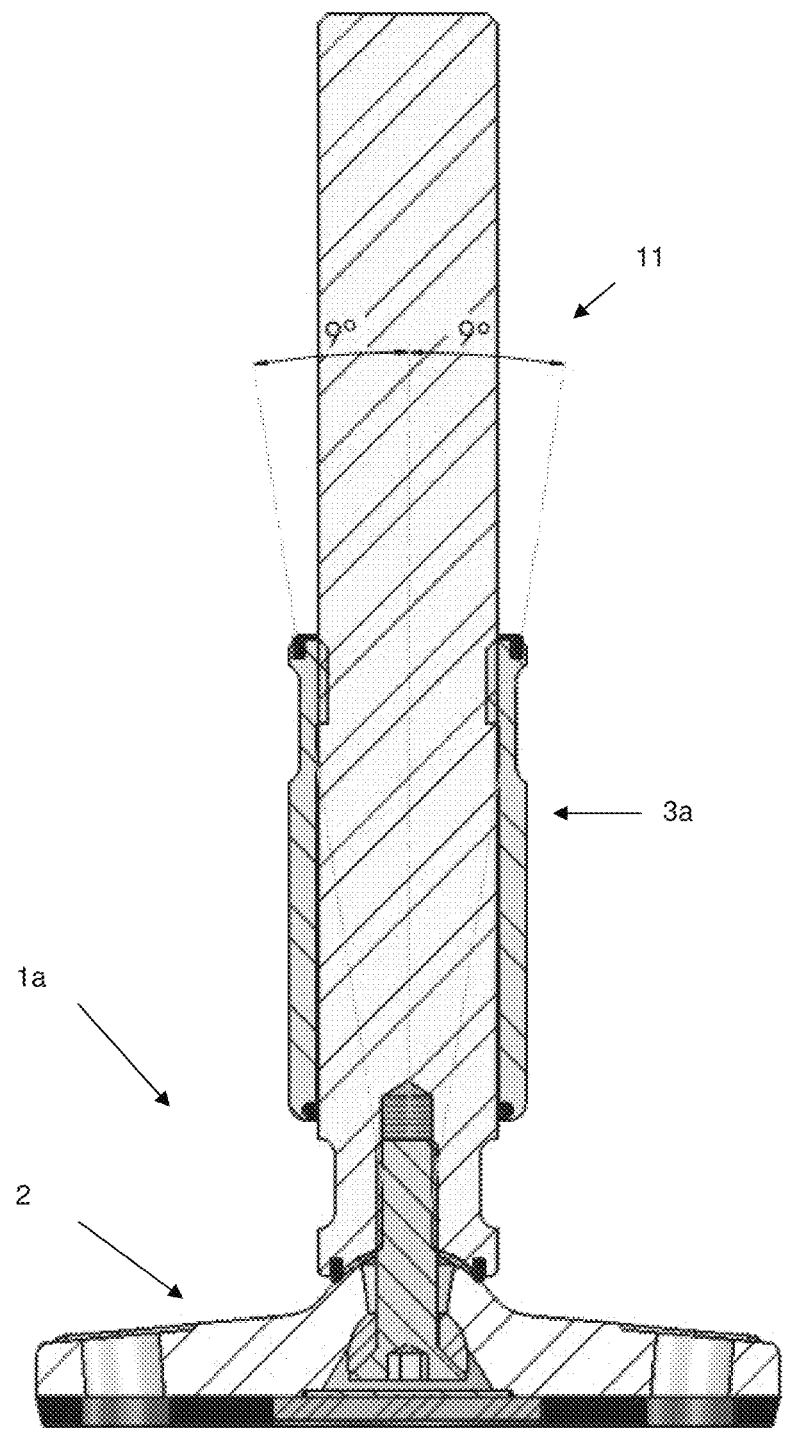
FIG. 1 shows a sectional view of a machine foot comprising a top part and a bottom part.

On FIG. 1 is shown a machine foot 1a that comprises a bottom part 2 and a top part 3a.

The machine foot 1a is constructed so that the top part can turn a number of degrees 11 in relation to the center axis of the bottom part 2.

Figure 2:
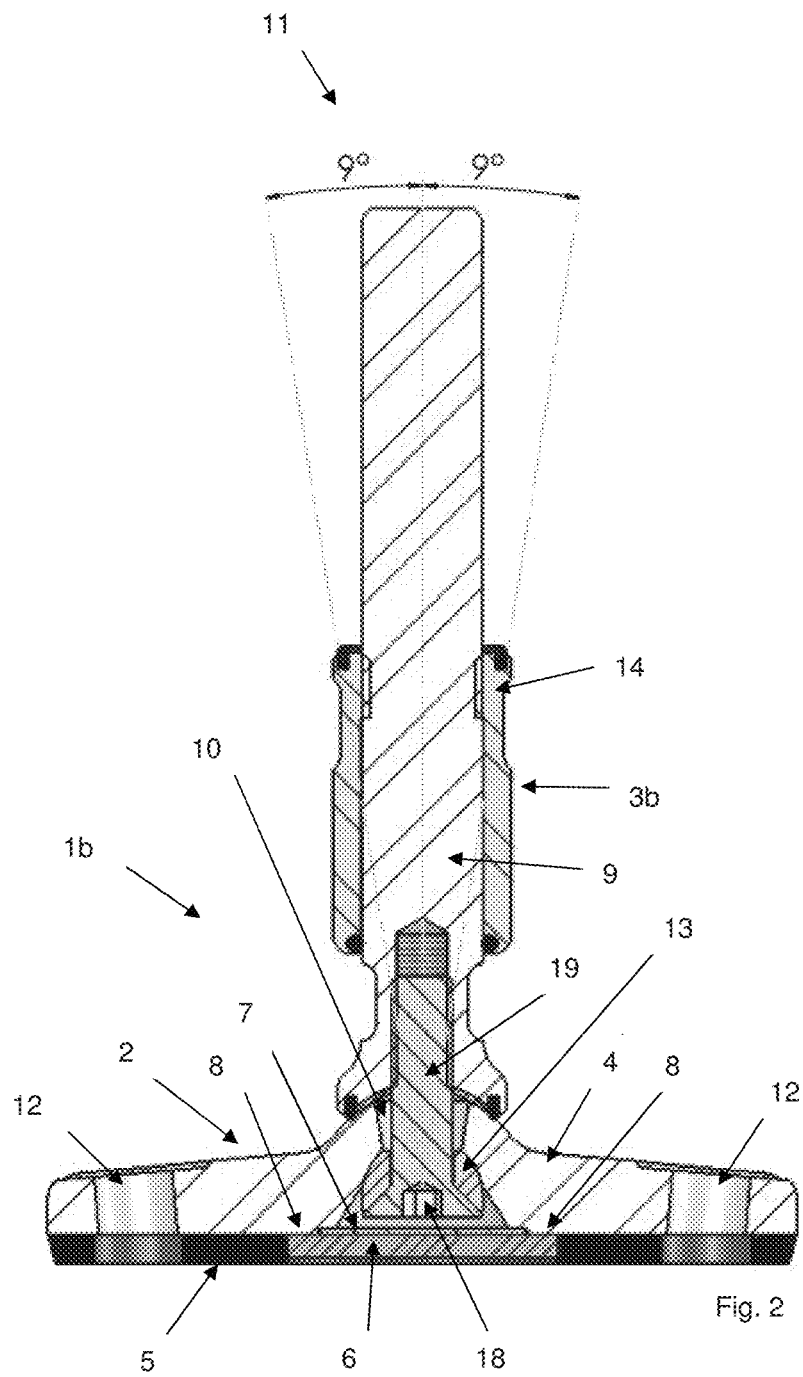
FIG. 2 shows a sectional view of a machine foot comprising another top part than the one shown in FIG. 1, but which comprises the same bottom part as the one shown in FIG. 1.

FIG. 2 shows a machine foot 1b, which comprises a bottom part 2 that is identical to the one shown in FIG. 1, but which comprises a top part 3b that is different from the top part 3a shown in FIG. 1.

The top part 3b of the machine foot 1b shown in FIG. 2 can turn a number of degrees 11 in relation to the center axis of the bottom part.

The bottom parts 2 shown in FIG. 1 and FIG. 2 comprises a housing 4 that preferably is made from a metallic material and in the bottom is provided with a polymeric material 5, which is shaped as a ring that surrounds a plug 6, which is attached to the housing 4 by being glued to a ring-shaped contact surface 8 at the periphery of the plug 6.

The plug 6 is made from a polymeric material, which is selected according to the given application for which the machine foot 1a,1b is to be used.

The plug 6 is circular in a preferred embodiment.

The width of the plug 6 is less than the width of the surrounding polymeric material 5.

Hereby is ensured that the plug does not come into direct contact with the surface of the foundation where upon the machine foot 1a,1b will be placed.

This has importance as the polymeric material 5 fitting around the plug can have a stronger attachment to the housing 4 than it will be possible for the plug 6, so when the width of the plug 6 is less than the width of the surrounding polymeric material 5, it will be the surrounding polymeric material 5 and not the plug 6 that is mechanically influenced by the support.

Between the plug 6 and the housing 4 is placed a cover plate 7 in the area within the ring-shaped contact surface 8, which cover plate preferably is made from a metallic material.

The top part 3a,3b is attached to the housing 4 of the lower part with a bolt 19, the head 18 of which is covered by the cover plate 7.

The bolt 19 gives the machine foot 1a,1b the necessary tension strength for example for earthquake endangered areas, which is especially required, when a machine foot 1a,1b is bolted to the support.

The common threaded faces of the bolt 19 and the top part 3a,3b are provided with a glue.

By using a special thread-glue is can be ensured that the bottom part 2 has a robust and stabile tensioning to a top part 3a,3b.

Between the head 18 of the bolt and the housing 4 is placed a ring 13 shaped as a hemisphere having a center which is the center of rotation for the movement of the top part 3a,3b in relation to the lower part 2.

The ring 13 shaped as a hemisphere is complementary in shape to the corresponding surface part of the housing 4, which together with among others clearance zone 10 ensures that a top part 3a,3b is movable a number of degrees 11, which in FIG. 1 and FIG. 2 is shown as plus minus 9 degrees in relation to the center axis of the bottom part.

In a preferred embodiment the polymeric material 5 is a rubber attached to the housing 4 by vulcanization.

Hereby is it ensured that the attachment of the polymeric material 6 to the housing 4 is optimal, just as the attachment ensures that dirt and or bacteria cannot enter into the machine foot 1a,1b via the bottom.

In the shown preferred embodiment the lower part 2 is provided with a number, preferably two holes 12, for attachment of the machine foot 1a,1b to a foundation.

As mentioned, the invention relates to the use of the above-mentioned machine foot 1a,1b at locations having high demands to hygiene, such as locations for processing of foodstuffs or manufacturing of medicine.

Including the use of the above-mentioned machine foot 1a,1b in relation in areas with risk of earthquakes.

Figure 3:
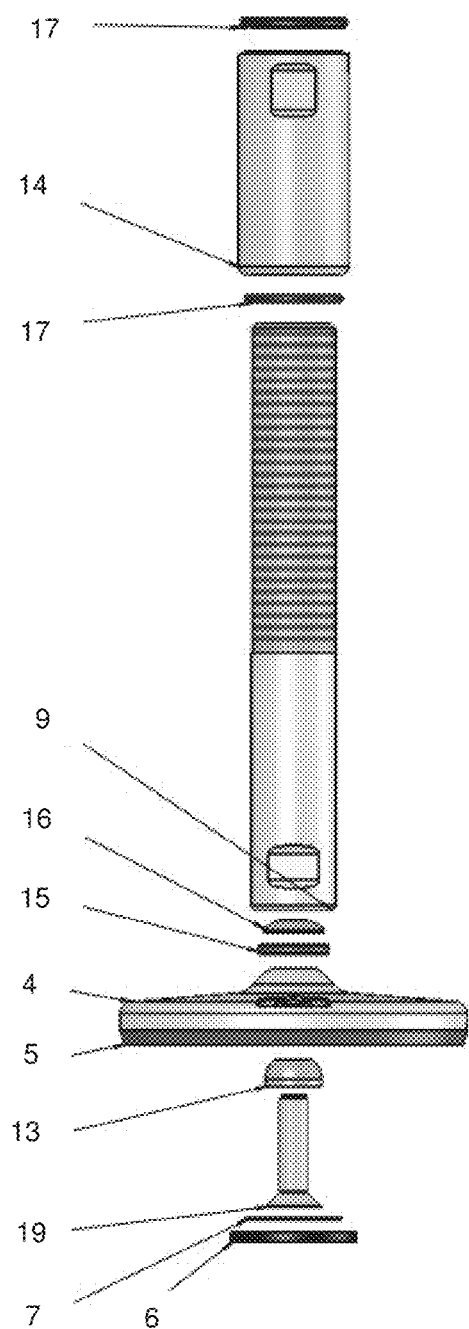
FIG. 3 shows a disassembled machine foot of the same type as the one shown in FIG. 2.

In FIG. 3 is shown a disassembled machine foot 1b, which is identical with that depicted in FIG. 2, and as seen from the bottom comprises a plug 6, a cover plate 7, a bolt 19, a ring 13 shaped as a hemisphere, a housing 4 with an annular-shaped polymeric material 5 in the bottom, a gasket 15, and a anti-friction disc 16, a spindle 9, a gasket 17, a screw thread shield 14 and a spacing ring 17.

The spindle 9 rests on the lower part 2 over a well-defined outer hemisphere. The center of the hemisphere is inside the foot, and around this same center there is an interior hemisphere form, wherein the ring 13 shaped as a hemisphere is embedded. Spindle 9 is fastened to the lower part 2 by means of the bolt 19, which via the hole in ring 13 shaped as a hemisphere, enters up into a threaded hole in the spindle 9. Besides the gasket 15 on spindle 9 there is a thin, preferably polymeric anti-friction disc 16 positioned between spindle 9 and lower part 2, so that the materials does not bind together.

From the above-mentioned and FIGS. 1 to 3 is thus evident that it is a special feature of the invention that the top part (3a,3b) is attached to the housing (4) of the lower part (2) with a bolt (19), between the head (18) of the bolt (19) and the housing (4) is placed a ring (13) shaped as a hemisphere the center of which is the center of rotation for the movement of the top part (3a,3b) in relation to the lower part (2), where the head (18) of the bolt (19) is covered by a cover plate (7) that preferably is made from a metallic material and abuts a recess in the housing (4), where the polymeric material (5) is shaped as a ring that surrounds a plug (6), which is attached to the housing (4) by gluing to an annular-shaped contact surface (8) at the periphery of the plug (6), and where the plug (6) has an upper surface that abuts the cover plate (7).

It is a part of the invention that the described machine foot (1a,1b) is used at locations having high demands to hygiene, such as locations for processing foodstuffs or manufacturing of medicine, including in areas having risk of earthquakes.

The invention claimed is:

1. A machine foot, comprising:
   a top part configured for attachment in a device, and
   a lower part configured for contact against a foundation,
      wherein a center axis of the top part is movable by way of rotation a number of degrees about an axis perpendicular to a center axis of the lower part, wherein the lower part comprises a housing having a polymeric material shaped as a ring at the bottom thereof and surrounding a plug attached to the housing by being glued to the housing at an annular contact surface at the periphery of the plug, wherein the top part is attached to the housing of the lower part with a bolt having a head, wherein a ring is positioned between the head of the bolt and the housing, wherein the ring is shaped as a hemisphere with a center of the hemisphere being the center of rotation for said movement of the top part in relation to the lower part, wherein the head of the bolt is covered by a cover plate abutting a recess in the housing, and wherein the plug has an upper surface abutting the cover plate.

2. The machine foot according to claim 1, wherein the plug is made from a polymeric material.

3. The machine foot according to claim 1, wherein the plug is circular.

4. The machine foot according to claim 1, wherein the width of the plug is less than the width of the surrounding polymeric material.

5. The machine foot according to claim 1, wherein common threaded faces of the bolt and the top part are provided with a glue.

6. The machine foot according to claim 1, wherein the polymeric material is a rubber attached to the housing by vulcanization.

7. The machine foot according to claim 1, wherein the lower part is provided with a plurality of holes for attachment of the machine foot to a foundation.

8. The machine foot according to claim 1, wherein between the lower part and the top part is placed an anti-friction disc and a gasket.

9. The use of the machine foot according to claim 1 at locations for processing foodstuffs or manufacturing of medicine.

10. The use of the machine foot according to claim 9 in areas with risk of earthquakes.

11. The machine foot according to claim 1, wherein the housing is made from a metal.

12. The machine foot according to claim 1, wherein the cover plate is made from a metallic material.

* * * * *